(12) United States Patent
Deckenhoff

(10) Patent No.: US 7,524,558 B2
(45) Date of Patent: Apr. 28, 2009

(54) GAS BAG

(75) Inventor: Michael Deckenhoff, Duelmen (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 358 days.

(21) Appl. No.: 11/336,114

(22) Filed: Jan. 20, 2006

(65) Prior Publication Data

US 2006/0252330 A1    Nov. 9, 2006

(30) Foreign Application Priority Data

Feb. 3, 2005   (DE) .................. 10 2005 005 023

(51) Int. Cl.
    *B32B 27/34*    (2006.01)
(52) U.S. Cl. .................... 428/395; 442/286; 280/728.1; 428/34.5; 428/391
(58) Field of Classification Search ................ 428/34.5, 428/34.6, 34.7, 391, 395; 280/728.1; 442/286
    See application file for complete search history.

(56) References Cited

U.S. PATENT DOCUMENTS

| 6,444,596 B1 | 9/2002 | Hirai et al. |
| 6,544,644 B1 | 4/2003 | Bouquerel et al. |

FOREIGN PATENT DOCUMENTS

| WO | 9304117 | 3/1993 |
| WO | 9941299 | 8/1999 |
| WO | 0102629 | 1/2001 |

*Primary Examiner*—Arti Singh-Pandey
(74) *Attorney, Agent, or Firm*—Tarolli, Sundheim, Covell & Tummino LLP

(57) ABSTRACT

The invention relates to a gas bag for use in a vehicle occupant restraint system, having at least one wall or a wall part made of a fabric which is formed from fibres, and which is characterized in that the fibres comprise a polymer matrix with exfoliated layered silicate particles dispersed therein, the exfoliated layered silicate particles having a thickness of 0.5 to 2 nm and a surface diameter of up to 10 μm.

11 Claims, No Drawings

GAS BAG

The invention relates to a gas bag for use in a vehicle occupant restraint system.

Gas bag fabrics generally consist of polyamides, for example polyamide 6 or polyamide 6.6. The fabrics are usually provided with a silicone coating as protection from the hot gases and particles released on activation of the gas generator and impinging onto the gas bag fabric. The coating also prevents the slow disintegration of the fabric material through the action of environmental influences such as rust and moisture.

DE 41 42 884 A1 describes a gas bag having a wall made of a fabric which is produced from composite fibres with a fibre core and a thermoplastic polymer bonded to the fibre core. The fibre core may be formed from polyamide fibres, polyester fibres and highly elastic fibres such as aramid fibres and polyethylene fibres.

The gas bag fabrics made of polyamide or other polymers have proved to be successful in practice and also fulfil the current requirements at the threshold temperatures between −35 degrees C. and +85 degrees C. However, an impairment to the stability of the fabric is to be observed, in particular in the low temperature range, under real temperature test conditions in the environmental test chamber.

The invention provides a gas bag fabric in which these disadvantages are avoided, which is stable over a long period and is heat resistant, even without a silicone coating, and which has an improved mechanical stability in particular at low temperatures. A gas bag is provided for this in accordance with the invention for use in a vehicle occupant restraint system, in which the gas bag comprises at least one wall or a wall part made of a fabric which is formed from fibres, characterized in that the fibres comprise a polymer matrix with exfoliated layered silicate particles dispersed therein, the exfoliated layered silicate particles having a thickness of 0.5 to 2 nm and a surface diameter of up to 10 μm.

The use of polymers which are filled in accordance with the invention with the platelet-shaped exfoliated layered silicate particles in the production of the gas bag fabrics leads to an improvement in almost all the mechanical properties of the fabrics. In particular, a distinct increase can be observed in the modulus of elasticity, the yield stress and the temperature resistance of the filled polymers. Furthermore, the surface quality of the fabrics, their liability to contamination and their chemical resistance and also the resistance to deformation by heat and the fireproofing characteristics are improved. As the fabrics also do not become brittle at low temperatures in the range of −35 degrees C. and with multiple temperature changes between −35 degrees C. and +85 degrees C. in the environmental test chamber, they can receive greater loads even at these temperatures. The functional reliability of the fabrics is thereby ensured particularly even at low temperatures.

The layered silicate particles are preferably present in a proportion of 0.5 to 10 parts by weight, particularly preferably from 1 to 6 parts by weight per 100 parts by weight of the polymer matrix. Natural or synthetic double-layered or triple-layered silicates which are suitable for ion exchange can be used as layered silicates. Typical representatives are montmorilonite, saponite, beidelite, nontronite, sauconite, stevensonite and hectorite, bentonite, vermiculite, halloysite, kaolin, calcium methasilicate or smectite and also chlorinated or fluorinated synthetic derivatives of these minerals, such as fluorosmectite. The layered silicates preferably have an ion exchange capacity of at least 20 to 200 meq/100 g (millie-equivalents in relation to 100 g solid content). The ion exchange capacity indicates the concentration of ions which are able to be substituted by solutions of neutral salts from the layered silicate surface through a stoichiometric ion exchange mechanism.

The surface of the layered silicate particles can be hydrophobized through ion exchange with organic onium compounds, such as for example ammonium compounds ($NR_4^+$), phosophonium compounds ($PR_4^+$), oxonium compounds ($R_3O^+$), diazonium compounds ($RN_2^+$), arsonium compounds ($AsR_4^+$) and sulfonium compounds ($R_3S^+$). The radicals R of the organic onium compound may be identical or different and are selected from the group consisting of hydrogen, substituted and unsubstituted, saturated and unsaturated alkyl groups having 1 to 40 carbon atoms with or without branching and substituted and unsubstituted aryl groups and benzyl groups, at least one organic radical R being a saturated or unsaturated alkyl group having at least 6 carbon atoms, which is unsubstituted or is substituted with functional groups.

The quaternary ammonium compounds which are derived from lactams or ω-amino acids and derivatives thereof are preferred.

The moulding material used for the production of the polymer fibres filled with the layered silicate particles can be formed through adding the layered silicates, which may have been hydrophobized, before, during or after the polymerization of the monomers to the polymer matrix. An addition after the polymerization preferably takes place to the melt of the matrix polymer in an extruder. Through the shearing forces acting during the extrusion, the layered silicates are exfoliated, i.e. delaminated, and the platelet-shaped layered silicate particles resulting therefrom are dispersed uniformly in the polymer matrix. The polymer matrix may consist of the polymers which are basically known for the production of gas bag fabrics. Thermoplastic polymers such as polyamide, and thermoplastic olefins and polyesters are particularly suitable.

The polymer matrix may additionally contain further fibrous reinforcement materials and/or mineral fillers. Glass fibres, carbon fibres, aramid fibres, mineral fibres and whiskers are suitable as fibrous reinforcement materials. Calcium carbonate, dolomite, calcium sulphate, mica, fluoromica, wollastonite, talcum and kaolin and also oxides and oxide hydrates of boron, aluminium, gallium, indium, silicon, tin, titanium, zirconium, zinc, yttrium or iron can be used as mineral fillers. The additional fillers are preferably present in a proportion of up to 30 parts by weight in relation to 100 parts by weight of the polymer matrix, and in addition to the exfoliated layered silicate particles.

Finally, a coupling agent for bonding the layered silicate particles to the polymer matrix can be contained in the polymer matrix. Suitable coupling agents are, for example, organosilanes and polysiloxanes having terminal functional groups, such as for example aminosilanes, vinylsilanes, glyzidoxysilanes or polysiloxanols, which on the one hand can bond chemically to the inorganic layered silicate particles and on the other hand to the organic polymer matrix. The coupling agents may be used in addition to the above-mentioned onium compounds or, when functionalized accordingly, also instead of the organic onium compounds. In addition, the coupling agents may also be linked indirectly to the layered silicate particles via functional groups of the onium compound. With the use of the coupling agents, a further improvement to the mechanical properties of the gas bag fabrics according to the invention is to be expected.

The moulding material obtained by compounding into the polymer matrix the layered silicates, which were hydrophobized and possibly modified by the admixing of coupling agents, can be processed into polymer fibres by known dry, wet or melt spinning methods, from which polymer fibres the gas bag fabrics according to the invention are able to be produced. The gas bag fabrics which are thus obtained are mechanically stable even at low temperatures and can therefore still receive high loads even in the threshold temperature range of −35 degrees C.

Further advantages of the invention will be apparent from the following description of a preferred example embodiment which, however, is not to be understood in a restrictive sense.

EXAMPLE EMBODIMENT 1

3 parts by weight of a layered silicate, which was hydrophobized, (bentonite, hydrophobized with dimethyldioctadecylammonium chloride; surface diameter >1 μm, layer thickness 0.5 to 2 nm) and 100 parts by weight polyamide 6 (Ultramid B5 Natur, BASF) were firstly homogenized in a mixer and then compounded on a twin screw extruder at approximately 260 degrees C., extruded into a water bath and granulated. Fibres were drawn from the granulate which was thus obtained, and were subjected to a temperature change test in the range between −35 degrees C. and 85 degrees C. in the environmental test chamber. Even after multiple temperature changes, no change to the mechanical properties of the polymer fibres was able to be established.

Comparative tests with pure polyamide 6 (Ultramid B5) for the polymer fibres filled with hydrophobized bentonite showed an increase of the E-modulus of 58%, of the yield stress of 19% and of the temperature resistance by 15 degrees C.

The invention claimed is:

1. A gas bag for a vehicle occupant restraint system, having at least one wall or a wall part made of a fabric which is formed from fibres, wherein the fibres comprise a polymer matrix with exfoliated layered silicate particles dispersed therein, the exfoliated layered silicate particles having a thickness of 0.5 to 2 nm and a surface diameter of up to 10 μm.

2. The gas bag according to claim 1, wherein the layered silicate particles are present in a proportion of 1 to 6 parts by weight per 100 parts by weight of the polymer matrix.

3. The gas bag according to claim 1, wherein the layered silicate particles are hydrophobized using organic onium compounds.

4. The gas bag according to claim 3, wherein the organic onium compounds are selected from the group consisting of amino acids and amino acid derivatives.

5. The gas bag according to claim 1, wherein the layered silicates are selected from the group consisting of montmorilonite, saponite, beidelite, nontronite, sauconite, stevensonite, hectorite, bentonite, vermiculite, halloysite, kaolin, calcium methasilicate, smectite and fluorosmectite.

6. The gas bag according to claim 1, wherein the polymer matrix further comprises a coupling agent for bonding the layered silicates with the polymer matrix.

7. The gas bag according to claim 6, wherein the coupling agent is selected from the group consisting of organosilanes and polysiloxanes having terminal functional groups.

8. The gas bag according to claim 7, wherein the coupling agent is selected from the group of aminosilanes, vinyl silanes, glyzidoxysilanes and polysiloxanols as well as derivatives and mixtures thereof.

9. The gas bag according to claim 1, wherein the polymer matrix is selected from the group consisting of thermoplastic polymers and thermoplastic elastomers.

10. The gas bag according to claim 1, wherein the polymer matrix consists of polyamide.

11. The gas bag according to claim 1, wherein the fabric is uncoated.

* * * * *